United States Patent [19]

Schuler et al.

[11] Patent Number: 5,889,672
[45] Date of Patent: Mar. 30, 1999

[54] TACTILEY RESPONSIVE USER INTERFACE DEVICE AND METHOD THEREFOR

[75] Inventors: Chester L. Schuler, Sudbury, Mass.; Seth M. Haberman, New York, N.Y.

[73] Assignee: Immersion Corporation, San Jose, Calif.

[21] Appl. No.: 89,799

[22] Filed: Jun. 3, 1998

Related U.S. Application Data

[63] Continuation of Ser. No. 585,198, Jan. 11, 1996, which is a continuation-in-part of Ser. No. 434,176, May 3, 1995, Pat. No. 5,559,412, which is a continuation of Ser. No. 76,344, Jun. 11, 1993, Pat. No. 5,414,337, which is a continuation-in-part of Ser. No. 783,635, Oct. 24, 1991, Pat. No. 5,220,260.

[51] Int. Cl.$^6$ .................................................. G05B 19/42
[52] U.S. Cl. .......................... 364/188; 364/189; 364/190; 364/191; 318/561; 318/601
[58] Field of Search ..................................... 364/188, 189, 364/190–194; 345/157, 158, 160, 161, 162, 163, 164, 165, 166, 167, 168; 318/560, 561, 637–638, 568, 600, 601, 615, 616, 646

[56] References Cited

U.S. PATENT DOCUMENTS

| | | | |
|---|---|---|---|
| 4,685,003 | 8/1987 | Westland | 360/14.1 |
| 4,937,685 | 6/1990 | Baker et al. | 360/14.1 |
| 4,939,594 | 7/1990 | Moxon et al. | 360/14.1 |
| 4,964,004 | 10/1990 | Baker | 360/14.1 |
| 4,979,050 | 12/1990 | Westfield et al. | 360/14.1 |
| 5,095,303 | 3/1992 | Clark et al. | 340/710 |
| 5,114,337 | 5/1992 | Schuler | 318/561 |
| 5,220,260 | 6/1993 | Schuler | 318/561 |
| 5,543,821 | 8/1996 | Marchis et al. | 345/167 |

Primary Examiner—Reba I. Elmore
Assistant Examiner—Ramesh Patel
Attorney, Agent, or Firm—James R. Riegel

[57] ABSTRACT

A method and apparatus implementing a user interface device, such as a mouse or trackball, having electronically controllable tactile responsiveness which is flexibly programmable. A user interface device effects positioning of a cursor within a limited area, such as on a display screen, with limits imposed by controllable tactile responsiveness. Programmable force-position characteristics relate the tactile responsiveness of the interface device to the position of the cursor within the limited area or on the display screen. In a described embodiment, the interface device includes at least two sets of wheels that move as the interface device is actuated. The at least two sets of wheels are aligned on mutually orthogonal axes. A servo motor is attached to each of the at least two sets of wheels. A position encoder is associated with each servo motor and outputs position information to a controller that has access to force-position relation information that is a function of a screen display on which the cursor is manipulated. The controller outputs a digital signal, in accordance with the force-display position relation information. The digital signal is converted to an analog current signal applied to the servo motor(s) to generate force in the servo motor. The force, presenting a tactile response to a human interacting with the user interface device, is perceived as a resistance, tactile pressure or lack thereof, or as a positive, assisted motion which is indicative of position on a screen display.

34 Claims, 13 Drawing Sheets

HERE IS A WINDOWS HEADER SHOWING THE COMMAND OPTIONS BANNER AS IT APPEARS ON THE SCREEN

DARK LINES HAVE BEEN ADDED TO DEFINE A TORQUE TROUGH ARROWS INDICATE MOTION IN X & Y AXES

CURVES BELOW SHOW TORQUE PROFILE FOR X & Y AXES MOVEMENTS INDICATED ABOVE.

TACTILEY RESPONSIVE USER INTERFACE DEVICE AND METHOD THEREFOR

This is a Continuation application of copending prior application Ser. No. 08/585,198, filed on Jan. 11, 1996, incorporated herein by reference, which is a continuation-in-part of U.S. patent application Ser. No. 08/434,176, filed May 3, 1995, issued as U.S. Pat. No. 5,559,412, which is a continuation of U.S. patent application Ser. No. 08/076,344, filed Jun. 11, 1993, issued as U.S. Pat. No. 5,414,337, which is a continuation-in-part of U.S. patent application Ser. No. 07/783,635, filed Oct. 24, 1991, issued as U.S. Pat. No. 5,220,260.

FIELD OF THE INVENTION

The present invention relates to user interface devices and in particular to devices providing tactile responsiveness and having programmable force-position profiles defining tactile responsiveness in manipulating a cursor on a screen display.

BACKGROUND OF THE INVENTION

In numerous contexts humans perform tasks by interacting with machines via actuators having knobs, dials or linear actuators. Such human interaction in many instances becomes conditioned upon the responsiveness of the actuator. The human operator interacts in accordance with tactile feedback perceived through contact with the actuator knobs, dials or handles.

For example, in video or film editing using systems as described in U.S. Pat. Nos. 4,937,685 and 4,964,004 which are incorporated herein by reference, an editor edits video image information at a console having a plurality of "control wheels" (i.e. large dials or knobs). The film or video editor controls operation of a composition system from an operator's console, as illustrated in FIG. 1, using two sets of controls, one for each hand, to control the editing process. Each control set includes a plurality of finger switches or pushbuttons 110 clustered proximate to a large rotatable control wheel 112, facilitating tactile operation with minimal hand movement. As the editor is focussing on at least one video monitor, viewing frames of visual source material during the editing function, it is generally the case that the operator will acquire a feel for the various controls and become acclimated to their functionality through tactile feedback therefrom, rather than having to look at the control wheel(s) for visual feedback. Accordingly, more efficient human interaction with, and sensitivity to the composition system is achieved.

The control wheels 112 exhibit tactile responsiveness, such as detents or clicks, as they are rotated. Typically, a full rotation of the wheel 112 is correlated to a unit of time, such as one second, of viewing the visual source material being edited. A corresponding number of "frames" of visual source material will be viewed during such a time period, depending on the medium or type of source material being edited. It is most desirable that the number of frames of source material be correlated to the tactile responsiveness, i.e. number of clicks, of the wheel 112 during rotation. For instance, film editing involves standardized source material of which twenty-four (24) frames are provided per second. Thus, it is most desirable that in a full rotation of the wheel 112 (presenting one second of source material), the wheel respond with twenty-four (24) clicks, each click corresponding to one frame of the visual source material.

While film editing involves source material having twenty-four (24) frames per second, other video medium standards require different frame rates. The frame rate, or number of frames per second according to the National Television System Committee (NTSC) is thirty (30) frames per second, a standard promulgated for television video in the United States. Standards such as PAL and SECAM provide for a standard frame rate of twenty-five (25) frames per second in England and France respectively. New standards for high definition television specify a frame rate of thirty (30) or sixty (60) frames per second.

Differing frame rate standards relating to visual source material and the nature of mechanical detents in actuators, presents the problem that multiple actuators are required to facilitate correlation between actuator tactile responsiveness and the various visual source material standards. As illustrated in FIG. 1a, actuators known in the art for providing tactile responsiveness typically incorporate a mechanical detent mechanism. A fixed number of clicks is provided by a spring loaded friction mechanism 111 coacting with a sprocket 113 having a fixed number of cogs or detents corresponding to the desired number of clicks per revolution. Therefore, an actuator having twenty-four fixed detents is required and dedicated for a film editing context, a thirty detent actuator is required for a NTSC video editing system, a twenty five detent actuator is required in the PAL or CCAM video editing context, etc. The plurality of actuators required limits the flexibility of visual source material composition systems and significantly increases the complexity, cost and hardware requirements of a flexible system.

In addition to the lack of flexibility of use of fixed mechanical detent actuators, such actuators disadvantageously become worn and suffer tactile responsiveness degradation over time. Other mechanically/spring loaded linear or rotary actuators suffer similar deficiencies.

Likewise, other types of actuators or user interface devices are known for permitting users to interact with electronic devices, such as personal computers. Such user interface devices, like a trackball or mouse as disclosed in U.S. Pat. No. 4,868,549 ("the '549 patent"), may include tactile responsiveness in the form of resistance to movement of the device as the device is actuated and the cursor moves across predetermined areas of the display screen.

In the '549 patent a mouse is disclosed which has an electromagnetic means, in the form of an electromagnet in conjunction with a magnetic surface or an electromagnetic brake, which provides resistance to the movement of a "spherical ball pickup". Feedback or tactile responsiveness is achieved in one embodiment by controlling the degree of sliding friction between a magnetic portion of the mouse and a magnetic pad surface on which the mouse must be actuated. Disadvantageously, the magnetic pad surface is a requirement in such an embodiment, and the friction forces between the pad and the mouse may be affected in ways that may not be predictable and might be detrimental to the tactile responsiveness.

In another embodiment in the '549 patent, an electromagnetic brake is included and resistance is provided by the brake directly to the spherical ball or tracking element. The braking mechanism is totally self-contained within the mouse eliminating the need for a magnetic pad surface. However, while the electromagnetic brake provides a stopping mechanism, it cannot provide a continuous torque to the tracking element, i.e. no torque is applied when the tracking element is stopped. Such a mechanism cannot be used to change tactile responsiveness, e.g. to decrease resistance, as a function of characteristics of a particular screen display. The resistance provided is only opposed to motion and cannot aid motion by actively driving the ball to facilitate ease of motion in certain display areas or to keep the cursor off of the boundary of a restricted display area.

SUMMARY OF THE INVENTION

The present invention provides an actuator having electronically controllable tactile responsiveness which is flexibly programmable to facilitate provision in a single actuator of torque-position characteristics, such as a selectable number of detents per actuation through its full operative path. In an illustrative case of a rotary actuator the present invention facilitates provision in a single actuator, of torque versus angular position characteristics, such as a selectable number of detents per revolution.

According to the invention, an actuator is in communication with a servo motor having a position encoder which outputs position information to a controller that has access to torque-position relation information. The output of the controller is a digital torque signal, in accordance with the torque-position relation information, which is converted to an analog current signal applied to the servo motor to generate torque in the servo motor. The torque, presenting a tactile response to a human interacting with the actuator, is sensed as a detent or a plurality of detents.

In further accord with the invention, the controller is a microprocessor which receives position information, from the encoder, through a counter as a position count. Torque-position relation information is stored in microprocessor accessible firmware as a table containing a series of particular torque values corresponding to a series of particular position values. The torque values, output as digital signals and converted by a digital to analog converter, can be modified in accordance with a plurality of stored torque versus position tables to facilitate flexible programming of various torque profiles.

Features of the invention include the capacity to store and modify torque profiles and to select one of a predetermined set of torque profiles to provide an actuator with a desired tactile responsiveness. The torque profiles, stored for example, in electrically erasable programmable read only memory can be changed via a computer in communication with the microprocessor. Upon system power down and subsequent power up, a previously entered torque profile can be present as a default profile.

In a further embodiment of the invention, a user interface device, such as a trackball or mouse, is provided and implemented with programmable tactile responsiveness. In a mouse or trackball embodiment, the device includes an interface mechanism comprised of at least two sets of wheels that move as a spherical ball or tracking element is actuated by a user. The wheels are aligned on mutually orthogonal axes and each of at least two sets of wheels has a servo motor attached thereto and a position encoder associated with each servo motor. Position information from the position encoder is received by a controller that has access to tactile force information, i.e. torque-display position information.

The torque-display position information relates a position or coordinate of a display entity or cursor on a display screen of an electronic device to a force or torque applied to the user interface device, effecting tactile responsiveness of the user interface device as a function of the display screen on which the display entity or cursor is manipulated. The controller, having received the display entity or cursor position information from the position encoders, generates an output which is a digital signal in accordance with the force-display position relation information. The force can be positive or negative, to assist or resist motion. In a disclosed embodiment, a digital torque signal output in accordance with torque-display position information is converted via a digital to analog converter, to an analog current signal which is applied to servo motors to generate torque in the servo motors. The torque generated in the servo motors is translated to the tracking element or ball of the user interface device and perceived by the user as tactile responsiveness that is a function of the position of the cursor on the screen display.

Features of the invention include the capability to effect tactile screen boundaries, and "walls" and "troughs" which correspond to button bar functions or icon placement on a drag-down menu, by increasing and decreasing resistance to further manipulation of the interface device by the user, or by aiding motion of the device. "Bumps" and other textures can be implemented on the screen display and tactilely perceived as the cursor is moved. Cell boundaries can be defined by hard stops or "hills" which a cursor will roll off to limit access to screen areas or otherwise provide an indication of cursor position without requiring the user to look at the screen. Different tactile response profiles can be stored to correspond to different screen displays and user applications. Physically impaired people can interface to computer applications without the need for sight or fine motor skills.

DESCRIPTION OF THE DRAWING

These and other features and advantages of the present invention will become more apparent in view of the following detailed description in conjunction with the accompanying drawing, of which.

DETAILED DESCRIPTION OF AN ILLUSTRATIVE EMBODIMENT

Figure 1:
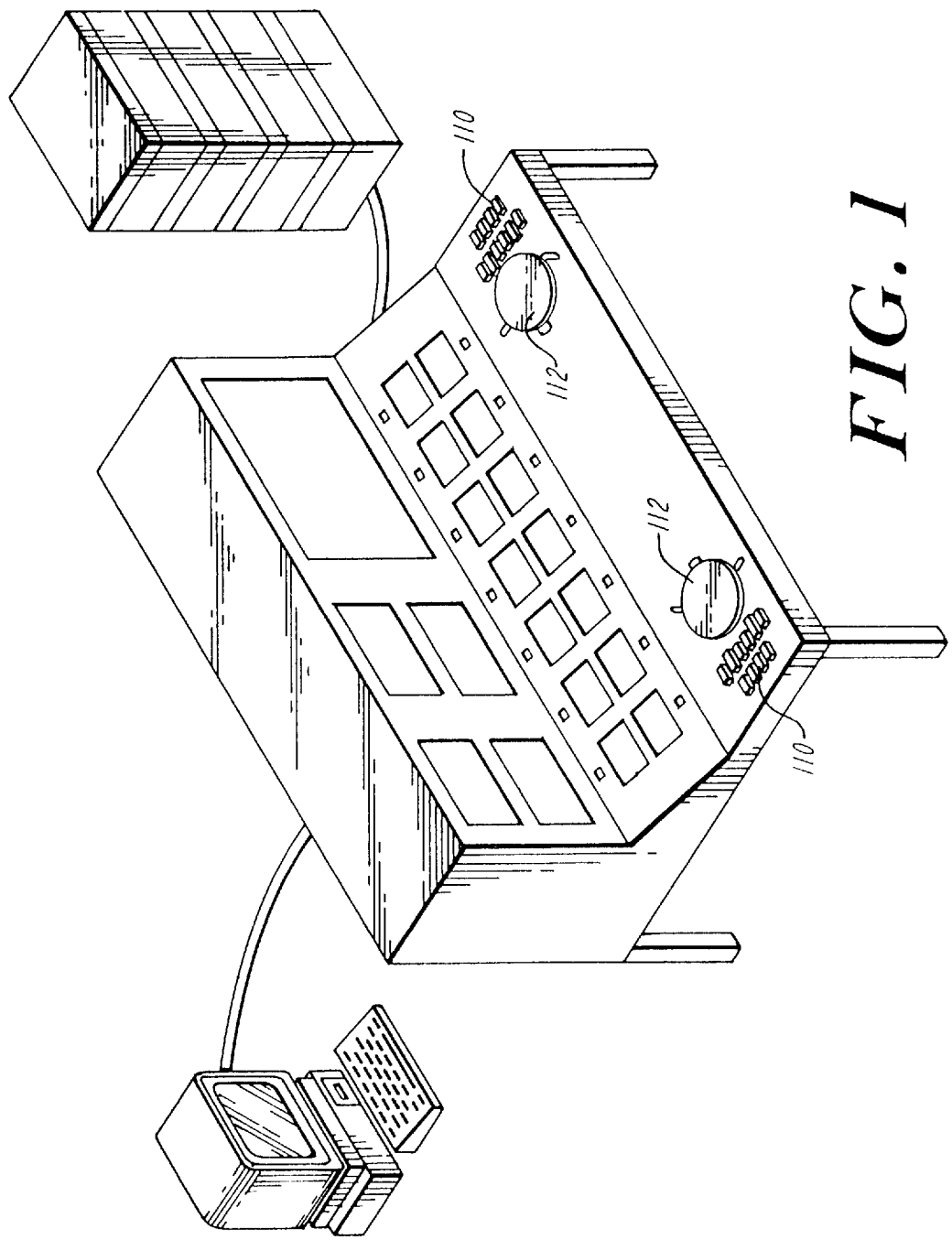
FIG. 1 is an illustration of an operator's console for editing visual source material in a composition system.
Figure 1A:
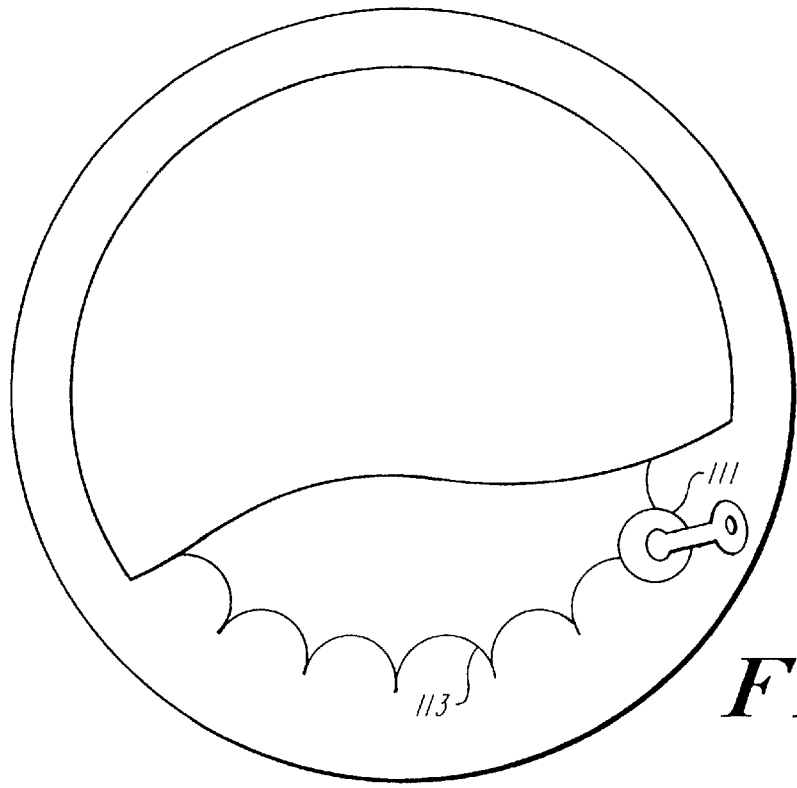
FIG. 1a is a partially broken-away view of an actuator according to the prior art having mechanical detents.
Figure 2:
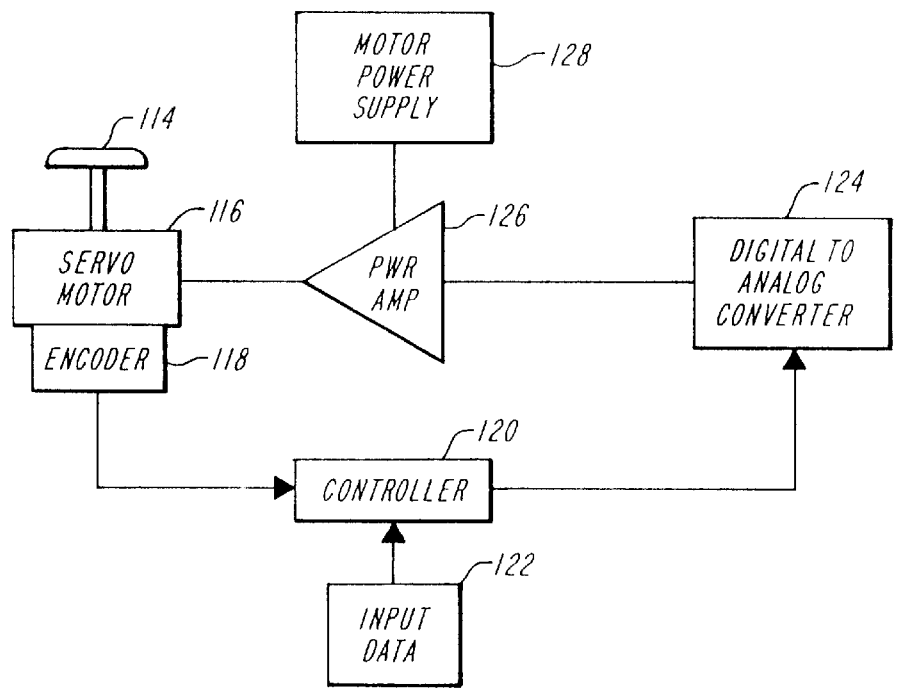
FIG. 2 is a block diagram of a system for providing programmable tactile feedback in an actuator.

Referring now to FIG. 2, an actuator, such as a rotary actuator having a control knob 114 is attached via a shaft to a servo motor 116. In this illustrative embodiment wherein the actuator is for use in a film/video editing context, the servo motor is a PMI 12FVS motor. In the present application, as discussed in greater detail hereinafter, the servo motor is not used as a motor per se, but rather as a torque controller. The motor never runs at a significant amount of its rated revolutions per minute, but operates normally in this application in a stalled or semi-stalled state. The preferred motor 116 has an installed encoder 118. The encoder 118 is a PMI M23, 300 segment modular encoder having an index and providing 300 cycles per revolution, which results in 1200 waveform edges from index to index. Note that in this illustrative embodiment it is important that the encoder be selected to provide a number of edges which is divisible by factors of two, three, five and eight. Thus, position information can be electronically divided to provide an integer number of clicks in selectable modes of 24, 25 and 30 positions per revolution (corresponding to the film/video editing standards of 24, 25 and 30 frames per second or revolution, as discussed hereinbefore).

The position information received from the encoder 118 is processed by a controller 120 so that it represents a positional count. The controller 120 accesses stored input data 122 in the form of torque-position relation information which correlates a received position count with a related torque value. As noted hereinbefore, the position count, which is a function of encoder output information, can be derived by electronically dividing position information provided by the encoder waveform, as desired into a selected number of positions or position values. The input data 122 accessed by the controller 120 will have stored torque values associated with the selected position values as provided in accordance with the desired torque profile. The controller 120 outputs the torque value as a digital signal which is converted by a latchable digital to analog converter 124 to an analog voltage. As a voltage applied to the motor would result in a proportional motor speed, the analog voltage is related to motor torque by generating a proportional motor current using a power amplifier 126 in conjunction with a motor power supply 128. The torque related current is applied to the motor 116 to present the desired torque which imparts the desired tactile responsiveness to the control knob 114.

Figure 3:
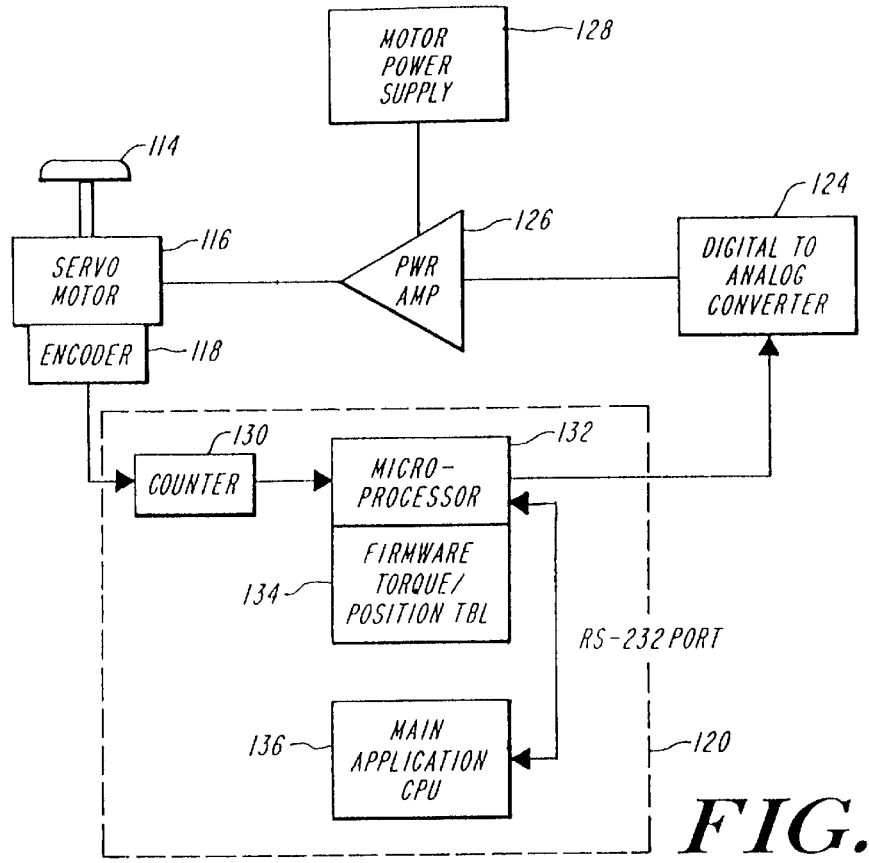
FIG. 3 is a block diagram of a system for providing programmable tactile feedback in an actuator, wherein the controller comprises a counter, microprocessor and accessible firmware.

In an embodiment illustrated in FIG. 3, the controller 120 comprises a counter 130 which receives the servo motor position information from the encoder 118. A microprocessor 132, such as a Motorola 6809, receives a position count from the counter 130 providing an indication of servo motor position relative to the index. The count provided by the counter will increment or decrement depending on the direction of the change of position of the servo motor. The microprocessor accesses electrically erasable programmable read only memory 134 (EEPROM) which is programmed with one or more tables of torque-position relation information. Each table defines a particular torque profile specifying a torque value corresponding to a particular position count (i.e. knob/servo motor position).

Figure 3A:
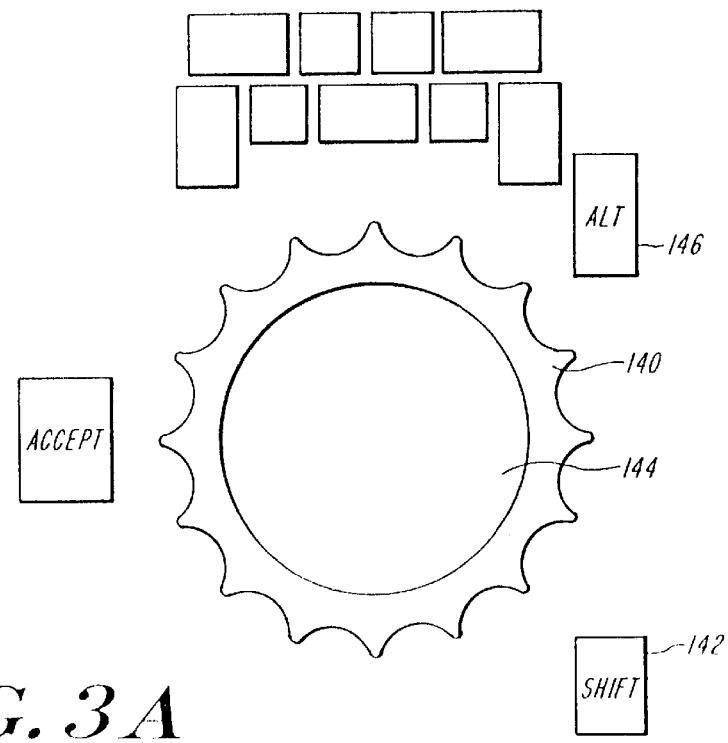
FIG. 3a is an illustrative diagram of an actuator and associated function keys for controlling multiple functions and providing multiple tactile responses in accordance with the selected function.

A main application CPU 136 runs an application which requires and defines particular torque profiles for the actuator 114. The main application CPU may run an application which defines the functionality of a control wheel and related function buttons as illustrated in FIG. 3a. In this illustrative embodiment the control wheel has an outer dial 140 which according to the application performs a first function having a fixed number of positions, such as selecting one of a plurality of switch settings. The application can assign a second function to the same outer dial 140 and provide a profile assigning an alternative responsiveness to the outer dial actuator, such as assigning a lever control function having electronically defined stop positions, when a shift key 142 is depressed. An inner control knob 144 similarly can be assigned a first function and corresponding torque profile (such as a free running non-detent scan function), by the application running on the main application CPU, and a second (or other) function and corresponding torque profile (such as a 30 detent per rotation edit mode, as discussed hereinbefore), which is invoked such as by depressing an alt key 146.

The main application CPU 136, upon application initialization, down loads the desired torque profiles to the microprocessor accessible EEPROM, via an RS-232 serial, or other communication port. The desired torque profiles reside in EEPROM and are selectable via the microprocessor for providing the desired torque at the appropriate actuator position(s) in accordance with the requirements of the main application. A desired torque profile can be selected by a user operating the control knob 144 or outer dial 140 actuators, alone or with other control functions such as the alt or shift keys, to be responsive in accordance with the first or second function. A change in actuator function, and a corresponding change in actuator responsiveness (i.e. torque profile) can be effected via selected key strokes, such as a shift key or function key implementation discussed.

The EEPROM resident tables will not change until a new set of profiles is programmed, i.e down loaded, into the microprocessor accessible memory. Thus, when the system is powered down and subsequently powered up, the previously selected torque profile is resident and available as a default mode for the respective actuators.

Figure 4:
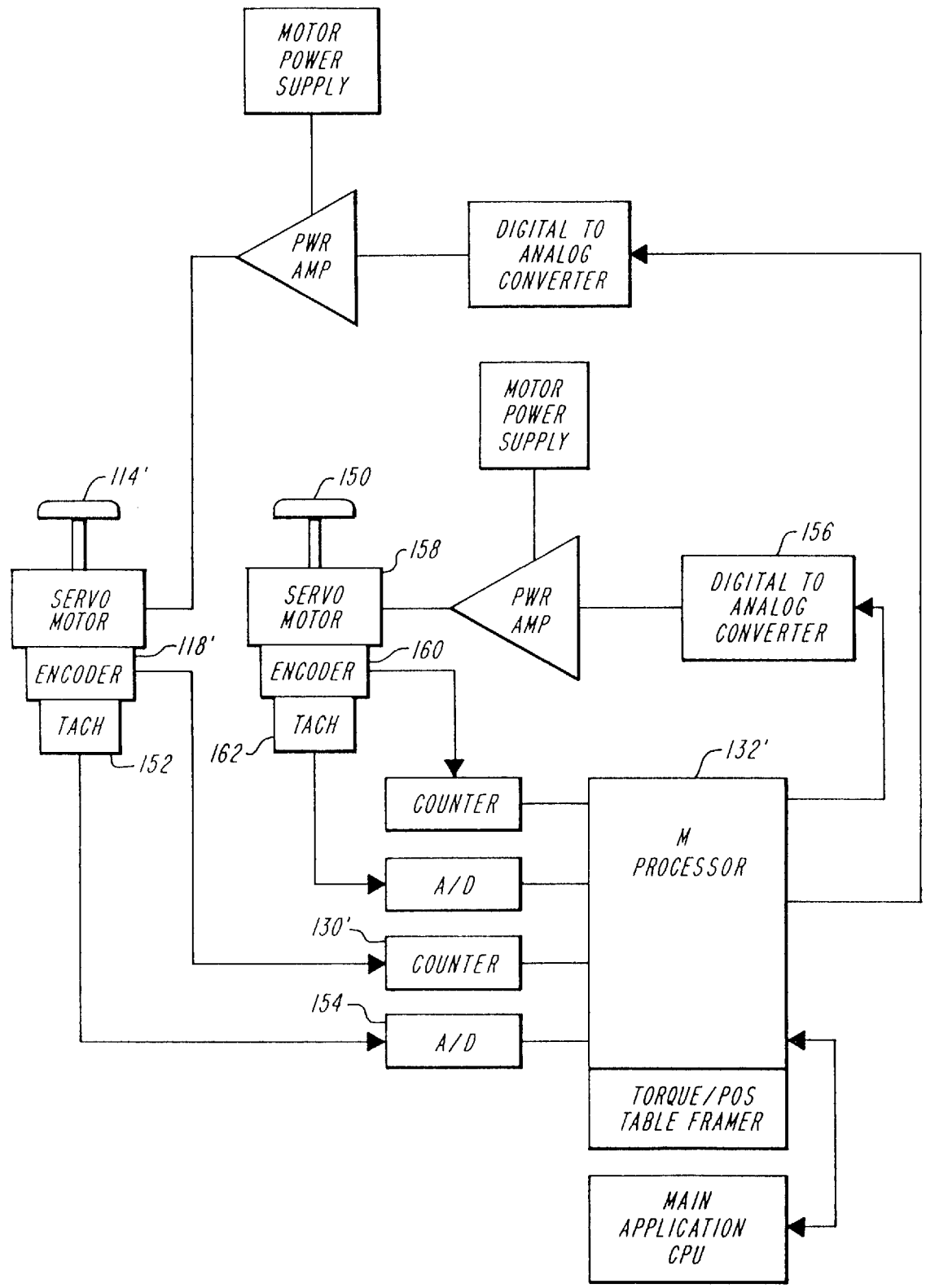
FIG. 4 is a block diagram of a system for providing programmable tactile feedback in an actuator, wherein the system further includes a tachometer sensing motor actuation to generate a corresponding actuation in an associated actuator.

As illustrated in FIG. 4, the selectable torque profiles and tactile responsiveness of the actuator according to the invention can be implemented so that a second actuator 150 is responsive to a first actuator 114', operating substantially as discussed hereinbefore. In certain operations it is desirable to have two actuators working in conjunction according to a common torque profile. In such a case, the servo motor of one actuator can be used to actually drive a second motor, in addition to its function as a torque controller.

For instance, it is desirable when editing film, to turn the first actuator 114' to add one or more frames to one end of the composition material while removing one or the same number of frames from an opposite end of the composition material controlled by the second actuator 150. In such a case, rather than trying to turn the respective control knobs exactly the same amount, it would be best to have the second actuator 150 respond according to the first actuator 114' and its associated torque profile.

As the first actuator 114' is manually rotated N clicks as sensed according to its torque profile implemented as discussed hereinbefore with respect to FIG. 3, the encoder 118' and a tachometer 152 associated with the first actuator 114' indicate the direction and speed, respectively, of the first actuator 114' to the microprocessor 132'. The direction and position of the first actuator 114' is received from the encoder 118' through the counter 130'. The rate of change of position, i.e. velocity, is indicated by the tachometer 152 as an analog signal, which must be converted by an analog to digital converter 154 for processing digitally by the microprocessor 132'. The microprocessor 132', in accordance with the count received from the first actuator 114' and a velocity profile, generates a digital signal which is delivered to the second actuator digital to analog converter 156 and converted to an analog signal, increasing power to a second actuator servo motor 158. The power increase to the second actuator servo motor 158 results in an actuation of the second motor in a direction according to the direction sensed, and according to an operation directed by the microprocessor. The microprocessor monitors a second actuator encoder 160 to read a complementary count from the second actuator 150 being driven, and monitors a second actuator tachometer 160 to sense a velocity comparable to that of the first actuator being manually actuated. When the comparisons indicate that the second actuator is actuated in accordance with the manual actuation of the first actuator, the operation is complete.

While the implementation of a driven actuator describes a tachometer for determining velocity of the actuators, it will be appreciated that velocity can be derived by the microprocessor using a mathematical operation which takes the first derivative of the rate of change of position information, eliminating the need for a tachometer. Further, although a motor power supply is indicated in FIG. 4 for each servo motor, it can be appreciated that a single power supply can be used for both motors.

Although the invention is described herein in the context of an actuator in a film/video editing context, one of ordinary skill in the art will appreciate that selectably programmable tactile responsiveness according to the invention can be provided in many contexts in which mode selection of tactile responsiveness is desirable.

While the actuator having electronically controllable tactile responsiveness is described herein as providing a selectable number of detents or clicks per rotation of a control wheel, it can be appreciated that other torque profiles, such as progressively increasing torque in one direction or another or increasing torque to a point of a pseudo hard stop, can be achieved according to the invention by introducing a torque profile which results in an appropriate current applied to the servo motor.

Further, although programmable tactile responsiveness is described in the context of a rotary actuator application, it will be appreciated that selectable tactile responsiveness can be implemented according to the invention in other applications and actuator contexts, such as in linear actuator contexts.

Figure 5B:
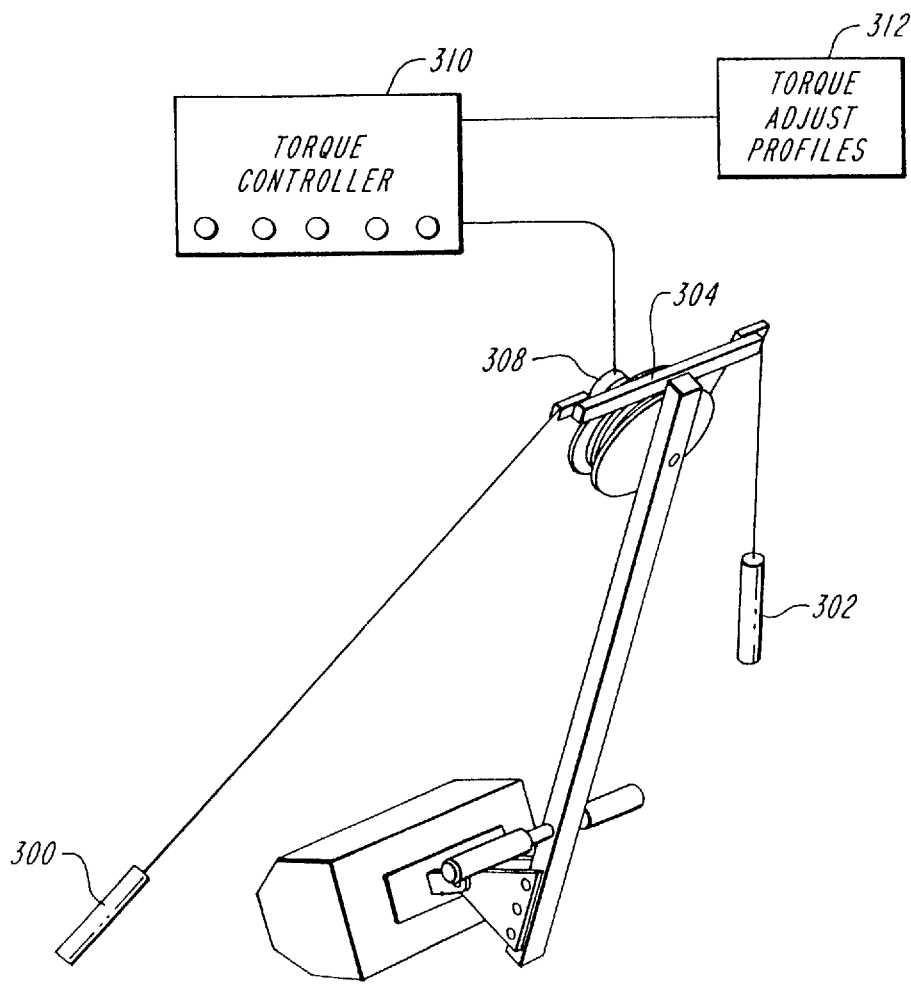
FIG. 5B is a block diagram illustrating implementation of a torque controller according to the invention implemented in an exercise machine.
Figure 5A:
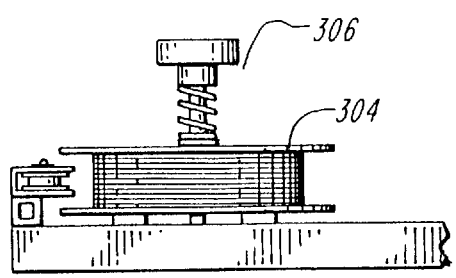
FIG. 5A is a view of a prior art mechanical means for introducing resistance in an exercise machine.

Referring now to FIGS. 5A and 5B, it will be appreciated by those of ordinary skill in the art in view of the foregoing, that the electronically controllable tactile responsiveness according to the invention can be implemented in actuators other than knob type actuators and in contexts other than video or film editing contexts. Various exercise machines have mechanisms for providing resistance, such as the mechanism illustrated in FIG. 5A. The linear motion of an exerciser pulling alternately on the handles 300, 302 of FIG. 5B is translated and imparts a rotary motion to a take-up spool 304 (FIGS. 5A and 5B). In known exercise machines, resistance is introduced at the take-up spool by tightening a mechanical/spring mechanism 306 (FIG. 5A) which increases the work required to impart linear motion to the handles 300, 302. The system according to the invention and described hereinbefore can be implemented in such a context by introducing a bidirectional servomotor 308 (FIG. 5B) which is adapted to receive bidirectional torque versus position information in the form of current profiles resulting in resistance similar to that introduced by the mechanical means of 306 of FIG. 5A. The current provided by the torque controller 310 is a function of torque adjust profiles 312 which are selectable/programmable and stored in a manner as discussed hereinbefore.

Figure 6:
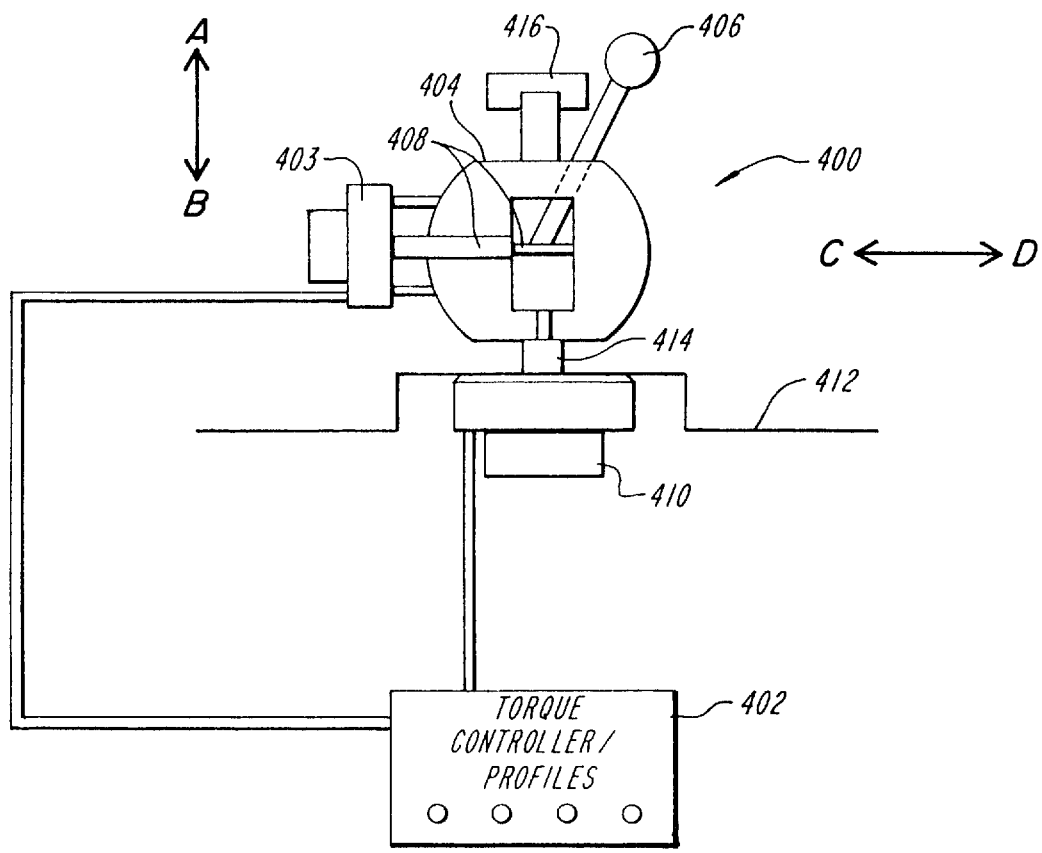
FIG. 6 is a block diagram of a joystick implementation of an actuator with electronically controllable tactile responsiveness.

Similarly, referring now to FIG. 6, programmable tactile responsiveness can be implemented in an actuator such as a joystick actuator 400. In such a context, torque profiles are stored in tables within a torque controller 402 in the form of at least two tables for containing profiles to control motors in at least two axes. A first servo motor 403 is attached to a sphere 404 to which a joystick 406 is fixed. The first motor 403 is fixed to the sphere 404 to which the joystick is fixed and controls the tactile responsiveness of the joystick 406 as it is linearly actuated in directions indicated by the arrow A-B. The linear motion of the joystick in the direction A-B is translated into a rotary motion by a shaft 408 forming an axis about which the joystick 406 rotates in a limited manner. The torque controller 402 contains at least one profile table that determines the current provided to the first servo motor 403 and ultimately determines the particular responsiveness of joystick 406 as it is actuated in directions A-B.

A second servo motor 410 is mounted to a fixed frame or surface 412 and controls responsiveness of the joystick 406 as it is actuated in the direction indicated by arrow C-D. An assembly comprised of the sphere 404, joystick 406 and first motor 403 is capable of limited rotation about an axis formed by a shaft 414 which is connected at a first end to the second motor 410 and at a second end to a bearing 416. As the joystick 406 is actuated in the direction C-D, the sphere 404, and first motor 403 to which the joystick 406 is attached is actuated having a responsiveness as determined by at least a second profile table stored in the torque controller 402.

Although the illustrative embodiments of the exercise implementation and joystick implementation describe controlled tactile responsiveness in a single axis and double axis context respectively, it will be appreciated by those of ordinary skill in the art that tactile responsiveness can be implemented in a plurality of axes greater than 2.

Furthermore, it will be appreciated by those of ordinary skill in the art that various mechanisms, such as the spool of the exerciser implementation, are useful for translating torque into linear force and/or linear force into rotational torque, and that the tables discussed hereinbefore while containing torque versus position profiles can be programmed to comprise force versus linear position profiles.

Figure 7:
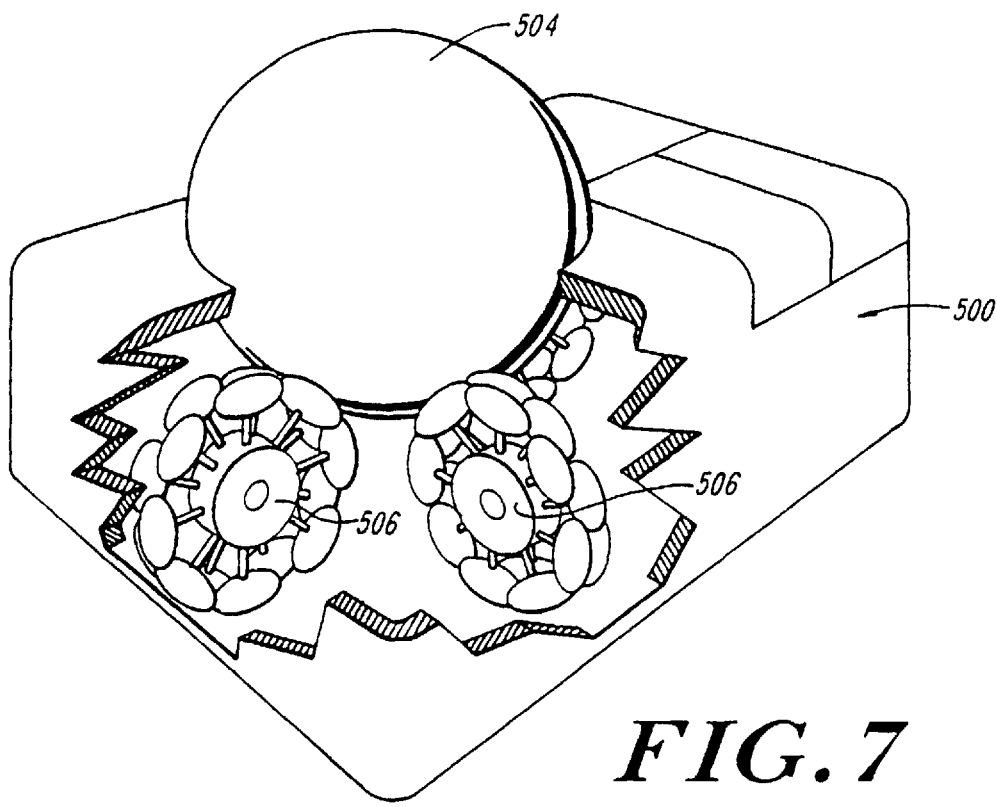
FIG. 7 is a perspective view, partially broken away, of a trackball implementation of a user interface device according to the invention.
Figure 9:
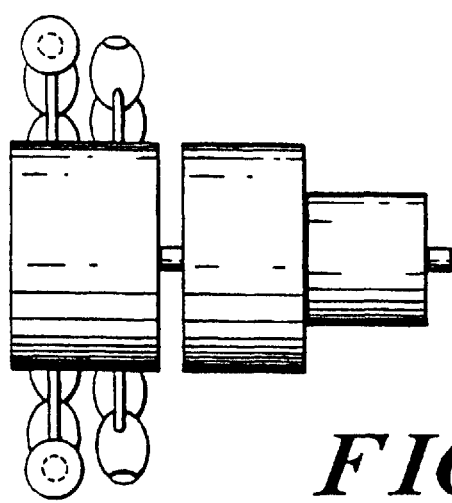
FIG. 9 is a plan view of the wheel assembly of FIGS. 8A and 8B attached to a motor and encoder assembly.

Referring now to FIGS. 7–9, a user interface device can be implemented according to the invention, to include tactile responsiveness as a function of the position of a display entity, e.g. cursor, on a screen display. In this illustrative embodiment a trackball 500 is implemented including a plurality of sets of drive wheels 502 which contact a tracking member or ball 504. As will be understood by those of ordinary skill in the art, manipulation of the tracking member or ball 504 effects manipulation or movement of a cursor on a screen display (not shown in FIGS. 7–9). The details of construction and manufacture of a trackball and/or mouse implementation will be understood by those of ordinary skill in the art, and therefore will not be presented here other than to present significant components and their interrelationships.

Figure 8B:
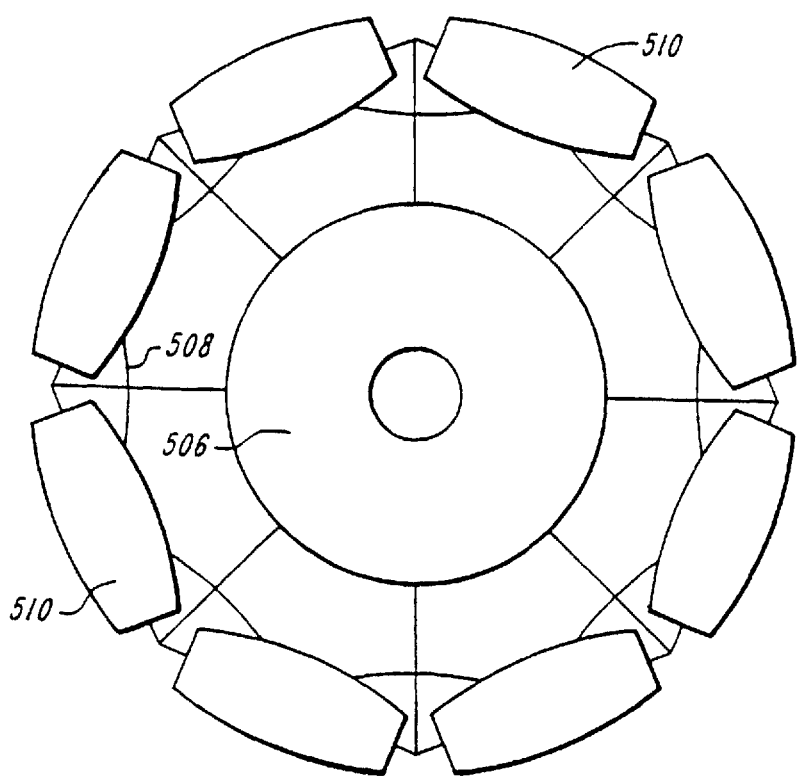
FIGS. 8A and 8B are front and side views, respectively, of a wheel assembly implemented in the trackball of FIG. 1.
Figure 8A:
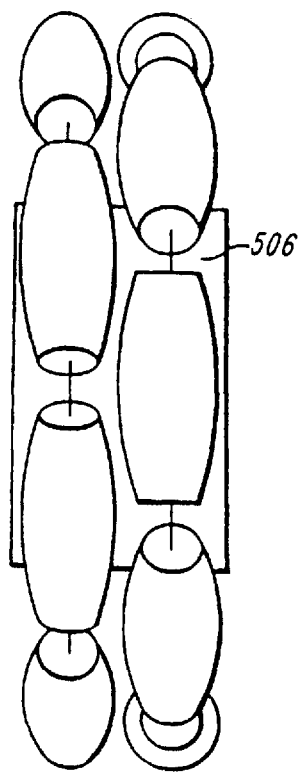

In this illustrative embodiment, the tracking member or ball is interconnected in the user interface device by an interconnection mechanism comprised of sets of drive wheels. Each of the sets of drive wheels 502, best illustrated in FIGS. 8A and 8B, is comprised of a hub 506 about which at least one frame structure 508 is configured. The frame(s) 508 have a plurality of frame portions each extending longitudinally through a respective one of a plurality of barrel-shaped gripping members 510. Preferably, the outside radius of a large portion of the gripping members 510 is equal to the outside radius of the drive wheels 502. Two drive wheels are used, offset slightly, to make the contact with the ball 504 smooth so as to avoid a "bumpy" feeling as the ball 504 is actuated and in turn actuates the wheels 502. The gripping members are each rotatable around the frame portion that extends through and supports it. The gripping members 510 are made of a polymeric material suitable for establishing gripping contact with the ball 504. In this illustrative embodiment, as illustrated in FIG. 8A, two frames 508 are configured about the hub 506. The gripping members 510 are offset or staggered in order to compensate for gaps between gripping members on a respective frame, to maintain a gripping member in contact with the ball 504 at all times.

Each pair of frames 508 attached to a common hub 506 and with associated gripping members 510, constitutes a wheel set that is attachable, as illustrated in FIG. 9, to a servo motor 512 and encoder 514 to form a drive/position assembly 516. In this illustrative embodiment the drive/position assembly servo motor is used actively as a motor. The servo motor may be a Pittman Model No. 8322 (manufactured by Pittman, Harleysville, Pa.), which optionally comes with an integrated optical encoder which fulfills the encoder requirement. At least one drive/position assembly 516 is configured to apply torque and sense position along a respective one of mutually orthogonally disposed axes, e.g. an x-axis corresponding to cursor movement across a display screen, a y-axis orthogonally disposed with respect to the x-axis and corresponding to cursor movement up and down on a screen, and a z-axis orthogonally disposed with respect to the x and y axes and corresponding to cursor movement in and out of a screen in a three dimensional configuration. In some instances, as described hereinafter, a wheel set is attached to a motor without an encoder, or just a bearing 518 to implement a complementary slave assembly 520 when it may not be desirable to include additional servo motors and/or encoders. The referenced servo motor, without an encoder, may be employed passively as a bearing.

Figure 10:
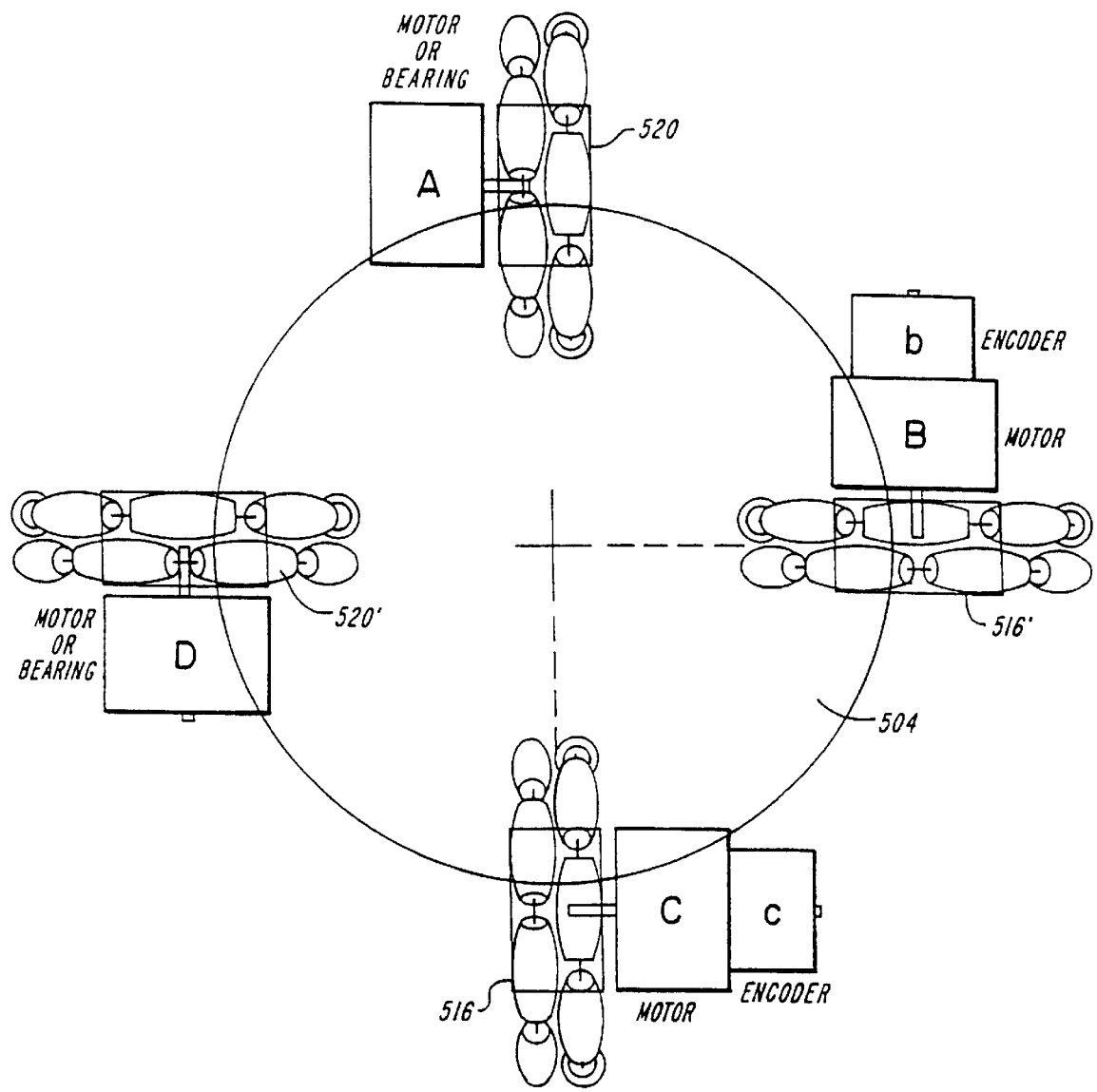
FIG. 10 is a diagrammatic representation of a pair of wheel sets having motors and encoders associated therewith, and contacting the tracking element.

To implement a two dimensional user interface device, e.g. trackball or mouse, the tracking element or ball 504 is configured to have at least two drive/position assemblies 516 positioned with the gripping members 510 in contact with the ball. As illustrated in FIG. 10, a first drive/position assembly 516 is positioned with the gripping members of its wheel set in contact with the ball, and includes a servo motor and encoder. A first complementary slave assembly 520 is positioned opposed to the first drive/position assembly 516 and has gripping members of its wheel set engaging the side of the ball 504 opposite the first drive/position assembly 516.

A second drive/position assembly 516' is positioned on an axis orthogonal with respect to the first drive/position assembly 516 and has a servo motor and encoder attached thereto. A second complementary slave assembly 520' is positioned opposed to the second drive/position assembly 516' and has gripping members of its wheel set engaging the side of the ball 504 opposite the second drive/position assembly 516'. In the illustrative two dimensional implementation, the complementary slave assemblies include motors that are slaved to the motors of the drive/position assemblies. Such slaved motors produce a complementary torque to assist the drive/position assemblies in applying a more balanced torque to the ball. It will be appreciated that a less expensive device can be implemented according to the invention by merely having the wheel sets opposed to the drive/position assemblies configured with a bearing to passively engage the ball.

Figure 10A:
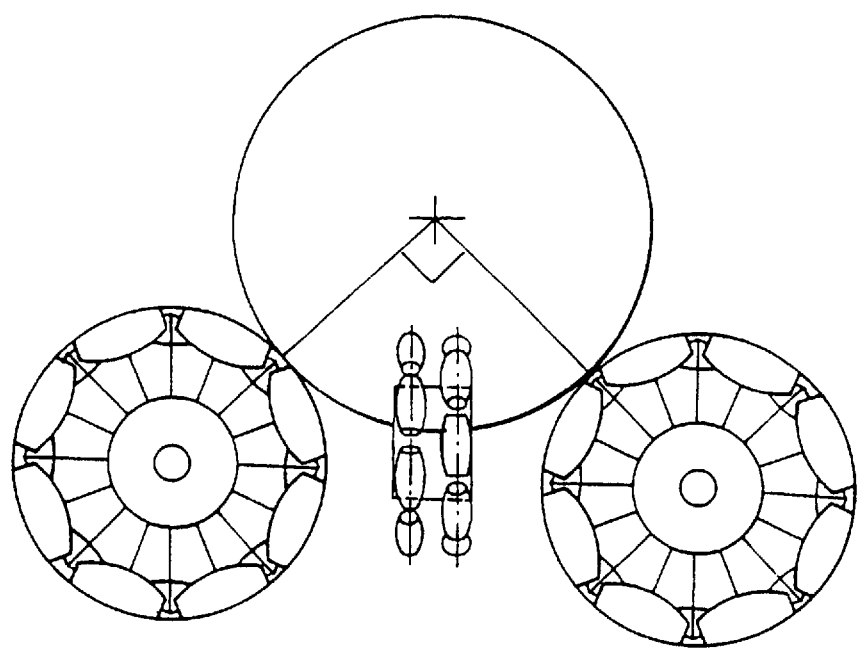
FIG. 10A is a diagrammatic representation of a wheel set disposed for a third axis (z-axis) responsiveness.

As illustrated in FIG. 10A, in implementing a three dimensional user interface device according to the invention, a drive/position assembly 516" is positioned along a circumference of the ball 504 such that the orientation of the wheel set is orthogonally disposed with respect to the orientation of the wheel sets of the x and y axis assemblies (in FIG. 10A for simplicity only one wheel set 516 is shown exemplifying the orientation of the x and y axis assemblies). The z-axis drive/position assembly 516" is preferably configured with a complementary slave assembly 520" disposed along an axis that is perpendicular to an axis along which the drive/position assembly 516" is disposed. Although the functionality of a two dimensional implementation is described hereinafter for ease of explanation, it will be appreciated that a z-axis drive/position assembly and complementary slave assembly can readily be implemented in a user interface device that is responsive in three dimensions.

Figure 11:
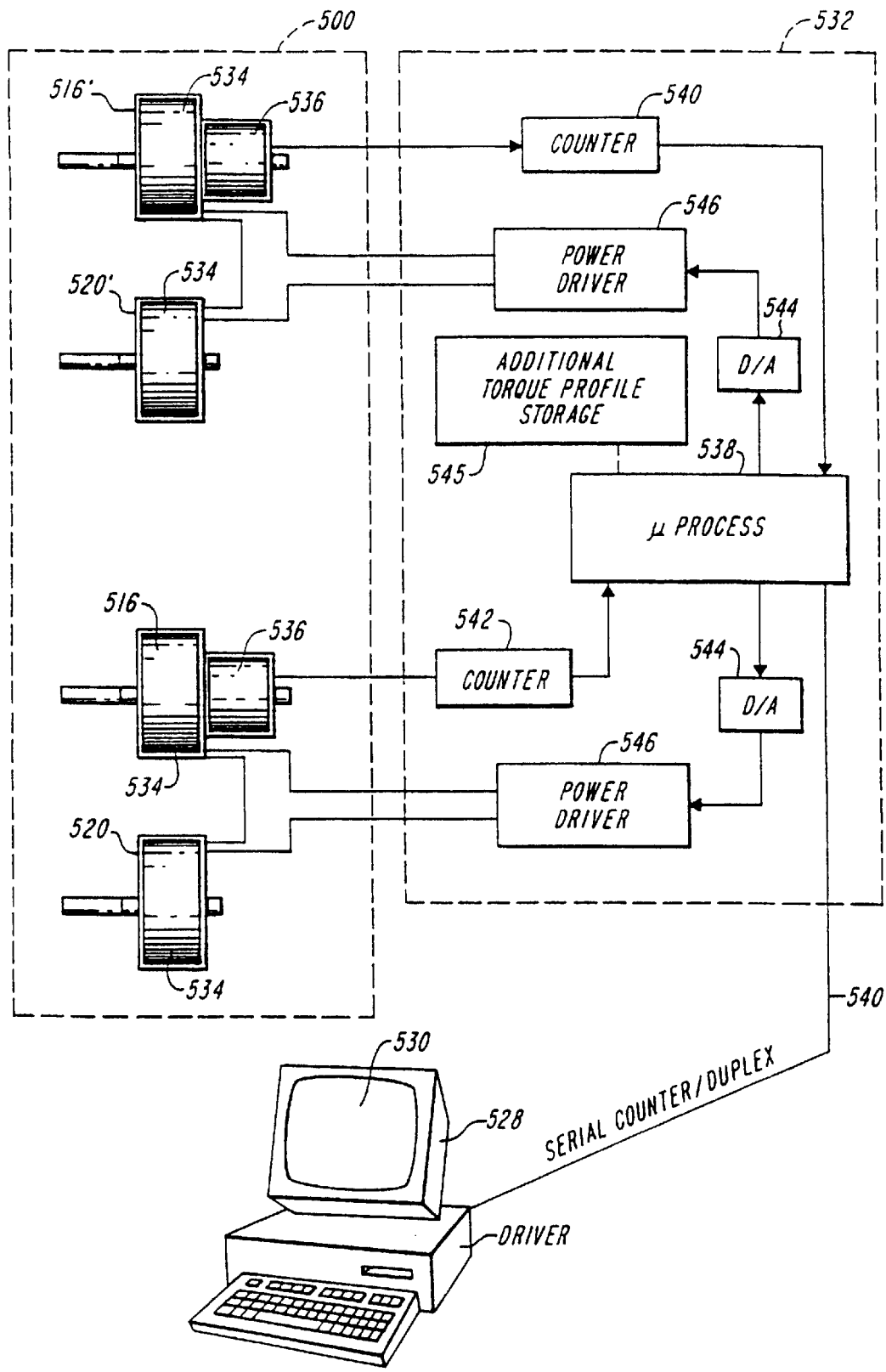
FIG. 11 is a diagrammatic representation of a user interface device according to the invention configured to interface to a personal computer.
Figure 12:
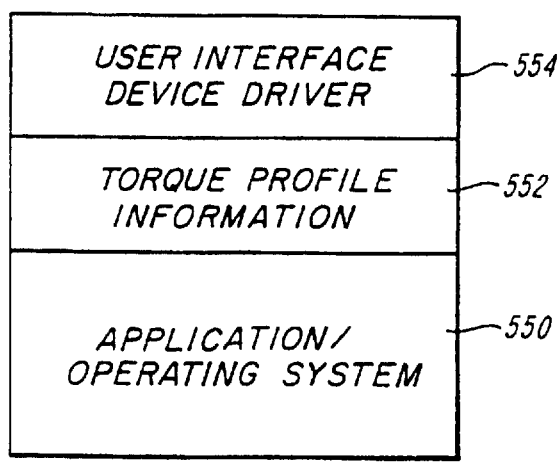
FIG. 12 is a block diagram of a system according to the invention.

Referring now to FIGS. 11 and 12, the drive/position assemblies 516 and complementary slave assemblies 520 are configured with the ball 504 (not shown in FIGS. 11 and 12), as a user interface device 500 in a system that includes an electronic device or computer system 528 with a screen 530 on which a cursor is positioned on a screen display or graphical user interface, as known in the art. The computer to which the user interface device 500 is connected has an operating system and is capable of running various application programs which result in various screen displays on which the cursor is manipulated using the user interface device 500.

The user interface device 500 includes at least a first and second drive/position assembly 516, 516' each with a servo motor 534 and encoder 536 and associated first and second complementary slave assemblies 520, 520' for respectively sensing y-axis and x-axis ball movement to be translated into a cursor position on the display. In this illustrative embodiment, each of the servo motors in the drive/position assemblies is connected in series with its respective complementary slave assembly motor which results in the motor pairs seeing the same current. In the present application each servo motor 534 is not used as a motor per se, but rather as a torque controller. The motor never runs at a significant amount of its rated revolutions per minute, but operates normally in this application in a stalled or semi-stalled state. The preferred motor, as discussed hereinabove, has an installed encoder 536. The encoder 536 is matched to the motor and the motor application as appreciated by one of ordinary skill in the art.

The computer or electronic device 528, as known in the art, is configured to accept an interface board 532 which includes the mechanisms required to electronically interface the user interface device 500 to the computer system 528 and display 530. The interface board 532 is typically configured to reside in an I/O slot of the computer 528 and includes a microprocessor 538 which communicates with the computer 528 via a serial communication channel 540. In the embodiment illustrated in FIG. 11, the interface board 532 comprises a counter 542 associated with each encoder 536. Each counter 542 receives servo motor position information from the encoder 118. The microprocessor 538, such as a Motorola 6809, receives a position count from each counter 542 providing an indication of position of each servo motor relative to an index. The count provided by the counter will be incremented or decremented depending on the direction of the change of position of the servo motor relative to the index, which is indicative of a change in position of the ball and the cursor on the screen display.

The microprocessor 538 accesses torque profile information from a storage mechanism as a function of the coordinate position indicated via the encoders, i.e. x-axis position and y-axis position. The storage mechanism can be internal to the microprocessor and/or external in the form of additional torque profile storage 545 (such as EEPROM, ROM, disk, CDROM etc). The torque profile information provides an indication of a torque or force to be applied by/to the motor. The torque is a function of the position of the cursor on the screen and a function of the particular screen display on which the cursor is being manipulated.

As in the embodiments described hereinbefore, the torque value, in this case a value for each motor or axis, is output from the storage mechanism as a digital signal which is converted by a latchable digital to analog converter (D/A) 544 to an analog voltage. As a voltage applied to the motor would result in a proportional motor speed, the analog voltage is related to motor torque by generating a proportional motor current using a power driver or amplifier 546 (for each motor). The torque related current is applied to the motor(s) 516, 516', 520, 520', to present the desired torque which imparts the desired tactile responsiveness to the ball 504.

The computer 528 runs an application, or several applications, which requires and defines particular torque profiles for the user interface device 500. Each screen display of an application running on the computer has torque profile information associated with that particular screen display to effect a corresponding particular tactile responsiveness for that screen display. The torque profile information which is being processed is stored in the microprocessor. Additional torque profile information which is not immediately required for a running screen display can be stored in external memory associated with the microprocessor 545. The torque profile information represents a spatial array that indicates the relationship of motor currents or torques as a function of position parameters for each axis present in the embodiment. In this illustrative embodiment the array must contain torque information for x and y axis motor pairs as a function of the x and y coordinate position of the cursor on the particular screen display(s).

Preferably, a large volume of torque profile information defining the tactile responsiveness of numerous screen displays of an application software package or an operating system is stored in a database associated with a particular application or applications that run on the computer. As illustrated in FIG. 12, the computer typically runs an operating system or main application 550 which is stored on some external storage medium such as a disk or CD ROM and paged or transferred to the computer's main memory as the application code is running.

A database of torque profiles 552, as part of an application running under the operating system or with the application 550, defines the tactile responsiveness of the user interface device based on the screen displays of the application(s). The torque profile information 552 is accessible to the application(s) or operating system(s) via the application's application program interface (API), as known in the art. The torque profiles relate the tactile responsiveness of the user interface device 500 to the graphical user interface(s) or screen display(s) of the application 550, as respective torque profiles are downloaded or made available to the microprocessor 538 on the interface board 532 to generate the appropriate digital signals in response to the position information received from the encoders, as discussed hereinbefore.

A user interface device driver 554 facilitates communication between the microprocessor 538 on the interface board 532 for the user interface device 500, and the host computer 528. The microprocessor computes coordinates for a change of cursor position by processing the information received from the encoders and information known about the original position of the cursor as provided by the host computer over the serial channel 540. The driver communicates the information related to cursor position to and from the host computer which effects actual positioning of the cursor. In the present embodiment, the driver 554 is generic to the user interface device 500 and is modified slightly from a mouse or trackball I/O device driver as known in the art, in that the driver 554, through an interface to the torque profile information 552 and application software 550 coordinates the downloading of appropriate torque profile information to the microprocessor based on indications from the application 550 as to the appropriate torque profile.

Based on the application being run on the host 528, the driver 554 running on the host communicates relevant torque profile information to the microprocessor 538. The driver also communicates information to the microprocessor regarding the present position of the cursor on the display screen of the host 528. In response to the coordinate information of the cursor on the display screen, the microprocessor 538 generates digital information corresponding to the appropriate torque relative to the position of the cursor on the screen, in accordance with the relevant torque-position profile for that screen display. The D/A 544 for each axis receives the digital torque information and produces the appropriate analog signal to the power driver(s) 546 which generate a current to apply the positive or negative torque to the motors resulting in the applicable tactile responsiveness of the ball 504.

When the trackball or mouse is moved to effect a movement of the cursor on the display screen 530, each encoder 536 sends position information to the microprocessor 538. Position information in this illustrative embodiment includes an indication of the direction and number of steps the encoder is changed in response to actuation of the associated wheel set in contact with the manually manipulated ball 504. The microprocessor 538 receives the magnitude and direction information and tracks the position in the spatial array of relevant torque profile information to determine the appropriate torque corresponding to the position information received. The microprocessor 538 communicates the position information to the user interface device driver which effects a change in the position of the cursor by communicating with the computer as is appreciated by those of skill in the art. The microprocessor 538 also conveys torque information to the servo motors, via the D/As and power drivers as described, to effect appropriate tactile responsiveness based on cursor position within the screen display of the particular application and torque-position information.

Figure 13A:
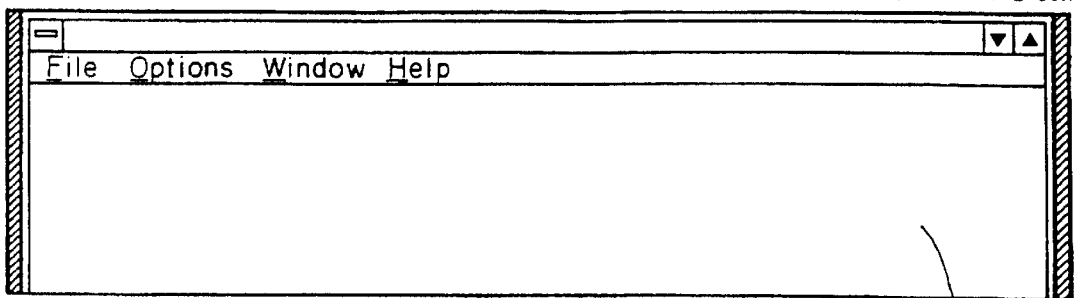
FIGS. 13A–13D show a user interface screen and profiles for tactile responsiveness implemented to effect characteristics of the screen.
Figure 13B:
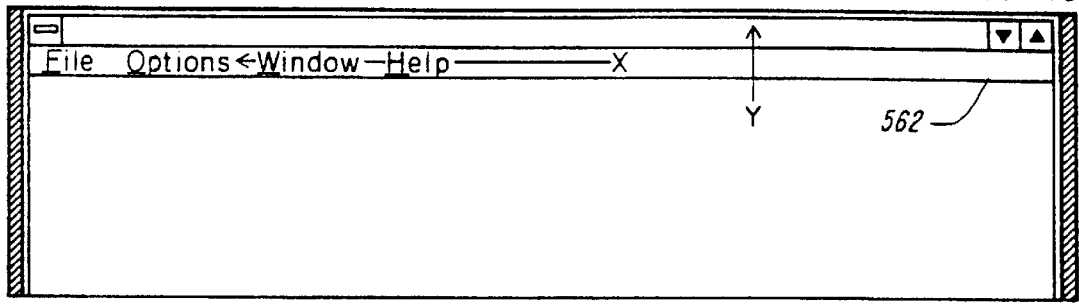

The torque-position information stored and made accessible to the microprocessor for implementing tactile responsiveness of the user interface device according to the invention can be used to implement various tactile responses as a function of position of the cursor on the screen display. Boundaries for cursor containment and restricted display areas can be implemented by effecting stops using maximized motor torque. Among other responsiveness, tactile "hills" and "troughs" can be implemented to define tactile contours of a graphical user interface such as illustrated in FIGS. 13A–13D. In this particular example of an application, a graphical user interface includes a header showing a command options banner as it appears on the display screen (FIGS. 13a and 13B).

Figure 13C:
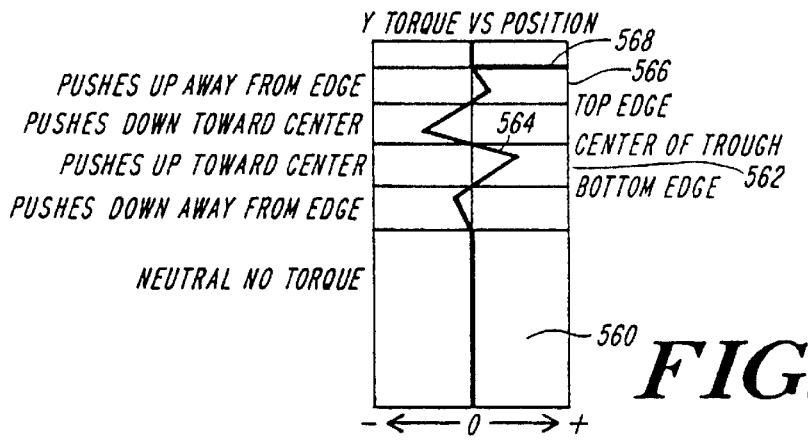

The command options banner is a button bar on which a cursor is positioned by a user using a user interface device to point and click to effect certain functionality. The various commands, i.e. "File," Options," "Window," "Help" can be delineated by tactile boundaries according to the invention, so that the proper positioning of the cursor within an appropriate area to click and invoke the command can be easily done and can be tactilely perceptible. With or without fine motor skills or vision, the user actuates the user interface device according to the invention and feels the position of the cursor on the screen display. Tactile boundaries are programmed, as discussed hereinbefore and as illustrated in FIGS. 13C and 13D, so that higher resistance is perceived at the boundaries with little or no resistance felt when the cursor is properly positioned.

Moving the cursor vertically on the screen toward the button bar the user will perceive neutral or no resistance in the unrestricted area 560. A sharp increase in torque will be felt as the lower boundary 562 of the button bar is encountered. When the cursor is actuated to a position between the lower boundary and an upper boundary, i.e. in a trough 564, no resistance is perceived. As the upper boundary 566 is approached the torque increases and as the absolute boundary of the screen is encountered increased torque effects a perceptible stop 568. It should be noted that positive and negative torques can be generated according to the invention so that the user interface device includes a tendency to urge the cursor into a position centered within the boundaries.

Figure 13D:
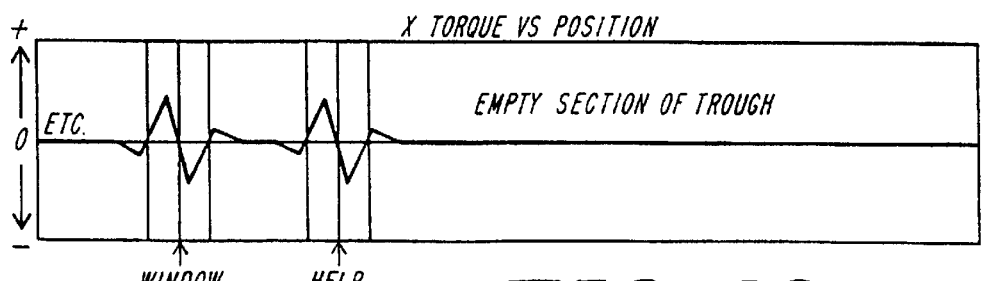

Likewise, when the user interface device is actuated to move the cursor horizontally along the button bar, as illustrated in FIG. 13D, boundaries are established that urge the cursor into the proper position to activate the desired menu selection.

It should be appreciated that in addition to boundaries formed by hills and troughs and walls, the tactile responsiveness of the user interface device according to the invention can be used to implement "texturing" that is tactilely perceptible. Slight increases in torque can be programmed at selected distances with lesser torque therebetween such that a feeling of bumpiness can be implemented as the cursor is actuated across a screen display. Elasticity, in the form of increasing torque to a point of reverse torque, can be implemented to simulate perceived stretching or resiliency. Furthermore, given the active nature of the torque assistance capability of the motor(s) in the user interface device according to the invention, motion assistance can be effected to make the device roll off of a bump or hill without manual assistance (such an application is especially useful where a user may not have fine motor skills).

The EEPROM resident tables or arrays of torque profile information will not change until a new set of profiles is programmed, i.e down loaded, into the microprocessor accessible memory. Thus, when the system is powered down and subsequently powered up, the previously selected torque profile is resident and available as a default mode for the respective actuators, unless a particular default state is desired and provided.

Although the invention is described hereinbefore with a singular screen display, it will be appreciated by those of ordinary skill in the art that the torque position information can be structured in a manner such that screens can be nested, and their corresponding profiles nested so that invoking a new screen from a present screen invokes a corresponding new set of torque position information.

It should be appreciated that although tables or arrays of torque profile information are discussed in the illustrative embodiment herein for relating cursor screen position with tactile responsiveness of the user interface device, torque values may be calculated "on the fly" for particular screen displays rather than storing values associated with particular positions. Additionally, rather than having the user interface device providing information regarding position and changes thereof, torque values may be associated with particular cursor locations on a particular screen display such that the screen generates the position information which is processed according to the invention to provide resultant tactile responsiveness.

In the embodiment where a slave motor is connected in series, the slave motor will see the same current as the motor with which it is connected in series. In such a master/slave motor pair, the motors should be virtually identical motors to effect smoothness of rotation of the ball or tracking element. However, in order to minimize cost of a system according to the invention, it will be appreciated that it may be preferable to exclude the slave motor in favor of a passive bearing.

The description of the invention hereinbefore relates to a trackball, but it will be appreciated that tactile responsiveness according to the invention can be implemented in various other user interface devices, including a mouse, joysticks and other devices requiring actuation and benefitting from the tactile responsiveness as a function of position. Further, while "a cursor" is manipulated in the embodiment described herein, that term is used generically to describe something manipulated in a user interface of an electronic device, and it should be appreciated that any of various symbols and interface or display resident entities can be manipulated with tactile responsiveness, such as cursors, icons, windows, menus, or the like.

While various embodiments of the invention illustrated herein describe a main CPU to execute an application program requiring and defining torque profiles for an actuator, and a separate 6809 microprocessor implementing firmware specifying torque-position relationships, one of ordinary skill in the art will appreciate that torque-position relationships can be implemented in the application CPU without the microprocessor or via numerous other microcontrollers. Further, while it is described that the torque profiles are in EEPROM accessible to the microprocessor it will be appreciated that the torque profiles can be stored in microprocessor resident or other storage means, such as ROM, RAM, PALs and the like, and accessed accordingly to implement the desired tactile responsiveness in an actuator.

Although the invention has been shown and described with respect to exemplary embodiments thereof, various other changes, additions and omissions in the form and detail thereof may be made therein without departing from the spirit and scope of the invention.

What is claimed is:

1. A programmable input and output device electrically coupled to a host computer running a host application, said device comprising:

a moveable member manipulatable by a human user in at least one degree of freedom;

a sensor that produces position signals specifying the position of said moveable member with respect to said at least one degree of freedom;

a memory, separate from a memory of said host computer and local to said device, in which a plurality of tactile responsiveness definitions are stored and are individually accessible in accordance with requirements of said host application;

a processor that is electrically coupled to said memory to access a desired tactile responsiveness definition that is selected from said plurality of stored tactile responsiveness definitions in accordance with requirements of said host application, said processor producing a torque signal in accordance with said selected tactical responsiveness definition; and an actuator electrically coupled to said processor and mechanically coupled to said moveable member, said actuator applying a torque upon said moveable member in said at least one degree of freedom in response to said torque signal, thereby generating a tactile responsiveness to said moveable member, the direction and a magnitude of said torque being specified by said selected tactile responsiveness definition.

2. The device of claim 1 wherein said actuator is a first actuator, and further comprising a second actuator.

3. The device of claim 2 wherein said first and second actuators operate in conjunction according to at least one selected tactile responsiveness definition.

4. The device of claim 3 wherein said moveable member is manipulatable in a plurality degrees of freedom.

5. The device of claim 4 wherein said movable member is a joystick.

6. The device of claim 1 wherein at least one of said tactile responsiveness definitions is downloaded from said host computer to said processor and stored in said memory during execution of said host application.

7. The device of claim 1 wherein at least one of said tactile responsiveness definitions is resident within said memory upon power-up of said device.

8. The device of claim 7 wherein said memory is a non volatile ROM type memory.

9. The device of claim 1 wherein said device can access said selectable tactile responsiveness definitions that are either a) downloaded from said host computer and stored in said local memory or b) resident in said local memory.

10. The device of claim 1 wherein said tactile responsiveness definition defines a torque versus position profile.

11. The device of claim 10 wherein said profile defines a progressively increasing torque with a change in position of said moveable member in one direction.

12. The device of claim 10 wherein said profile defines a detent.

13. The device of claim 10 wherein said profile defines a hard stop.

14. The device of claim 1 wherein said tactile responsiveness definition includes a stored table of torque values.

15. The device of claim 1 wherein said movable member is a wheel.

16. The device of claim 1 wherein a portion of said memory is non-volatile and is used for permanently storing a plurality of predetermined tactile responsiveness definitions, wherein said processor can select one of said permanently stored tactile responsiveness definitions in accordance with the host application.

17. The device of claim 1 wherein said processor receives a plurality of tactile responsiveness definitions from said host computer and stores said plurality of tactile responsiveness definitions in said memory.

18. The device of claim 1 wherein said processor determines a velocity of said moveable member from said position signals.

19. The device of claim 18 wherein said processor generates said torque signal in accordance with said velocity.

20. A programmable tactile simulation device electrically coupled to a host computer running a host application, said device comprising:

a) a movable member manipulatable by a human user in at least one degree of freedom;

b) a sensor that produces position signals specifying the position of said movable member with respect to said one degree of freedom;

c) a memory in which a plurality of tactile responsiveness definitions are stored, at least one of said tactile responsiveness definitions including data received from said host computer across a communication connection; and d) a processor that is electrically coupled to said memory, said processor receiving said data from said host computer to store said data in said memory, and accessing desired tactile responsiveness definitions in accordance with requirements of said host application, said processor controlling an output of at least one actuator that is mechanically coupled to said movable member, thereby generating a desired tactile responsiveness on said movable member.

21. A programmable tactile simulation device as recited in claim 20 wherein at least one of said tactile responsiveness definitions defines a torque versus position relationship.

22. A programmable tactile simulation device as recited in claim 20 wherein at least two tactile responsiveness definitions are stored in said memory and wherein each of said two definitions defines a different torque versus position relationship.

23. A programmable tactile simulation device as recited in claim 20 wherein said tactile responsiveness definition includes a table of values.

24. A programmable tactile simulation device as recited in claim 23 wherein said table includes data indicating the magnitude of a torque to be output by said motor.

25. A programmable tactile simulation device as recited in claim 20 wherein said movable member is coupled to said motor through a flexible cable.

26. A programmable tactile simulation device as recited in claim 20 wherein said movable member is a joystick.

27. A programmable tactile simulation device as recited in claim 20 wherein said movable member is a mouse.

28. A programmable tactile simulation device as recited in claim 20 wherein said movable member is a trackball.

29. A programmable tactile simulation device as recited in claim 20 wherein said processor conveys to said host computer data specifying the position of said movable member so that said host computer can display a cursor in an appropriate location.

30. A method for providing tactile sensations for a moveable member of a programmable tactile simulation device, the method comprising:
   a) providing a movable member manipulatable by a human user in at least one degree of freedom;
   b) producing position signals specifying the position of said movable member with respect to said one degree of freedom;
   c) storing a plurality of tactile responsiveness definitions local to said programmable tactile simulation device, at least one of said tactile responsiveness definitions including data received from a host computer across a communication connection; and
   d) accessing at least one of said tactile responsiveness definitions in accordance with requirements of a host application running on said host computer, and controlling an output torque of at least one actuator mechanically coupled to said movable member in accordance with said at least one accessed tactile responsiveness definition, thereby generating a desired tactile responsiveness on said movable member.

31. The method of claim 30 wherein said tactile responsiveness definition defines a torque versus position profile, and wherein said actuator is controlled to output a progressively increasing torque with a change in position of said moveable member in one direction.

32. The method of claim 30 wherein said actuator is controlled to output a detent.

33. The method of claim 30 wherein said actuator is controlled to output a hard stop.

34. The method of claim 30 further comprising determining a velocity of said moveable member from said position signals and controlling an output torque in accordance with said velocity.

* * * * *